United States Patent [19]

Rettenmaier et al.

[11] Patent Number: 5,128,852
[45] Date of Patent: Jul. 7, 1992

[54] CURRENT-FED PUSH-PULL CONVERTER

[75] Inventors: Helmut Rettenmaier, Grossaitingen; Peter Busch, Augsburg, both of Fed. Rep. of Germany

[73] Assignee: Siemens Nixdorf Informationssysteme AG, Munich, Fed. Rep. of Germany

[21] Appl. No.: 689,540

[22] Filed: Apr. 23, 1991

[30] Foreign Application Priority Data

Apr. 24, 1990 [DE] Fed. Rep. of Germany ....... 4013213

[51] Int. Cl.⁵ .................................. H02M 3/335
[52] U.S. Cl. ......................... 363/24; 363/133
[58] Field of Search ............. 363/22, 23, 24, 25, 363/26, 133, 134

[56] References Cited

U.S. PATENT DOCUMENTS

| | | | |
|---|---|---|---|
| 3,886,429 | 5/1975 | Maillard et al. | 363/23 |
| 3,898,549 | 8/1975 | Mitchell | 363/26 |
| 4,004,187 | 1/1977 | Walker | 363/23 |
| 4,245,286 | 1/1981 | Paulkovich et al. | 363/21 |
| 4,811,185 | 3/1989 | Cook et al. | 363/24 |
| 4,873,617 | 10/1989 | Fredrick et al. | 363/26 |
| 4,980,574 | 12/1990 | Cirrito | 363/134 |

FOREIGN PATENT DOCUMENTS

2941009C2 4/1981 Fed. Rep. of Germany.
3538494A1 5/1987 Fed. Rep. of Germany.

OTHER PUBLICATIONS

"Transistorbestuckter Oszillograf" by B. Rodekurth Funk-Technik, May 1968, Nr. 5, pp. 173-175.
"Gleichspannungswandler Fur Schaltnetzteile" by J. Wustechube, Elektronik, Apr. 1978, 4, pp. 102-107.

Primary Examiner—J. L. Sterrett
Attorney, Agent, or Firm—Hill, Van Santen, Steadman & Simpson

[57] ABSTRACT

Current-fed push-pull converter. In a current-fed push-pull converter that is composed of a step-down regulator and of a push-pull controlled transformer, the transformer is connected following the step-down regulator. The converter also has push-pull switches, a transformer unit and at least one DC voltage top circuit for a respective output DC voltage. The transformer unit is formed by an auto transformer.

10 Claims, 2 Drawing Sheets

CURRENT-FED PUSH-PULL CONVERTER

BACKGROUND OF THE INVENTION

The present invention is directed to a current-fed push-pull converter and, in particular, to a current-fed push-pull converter having a step-down regulating means and a transformer means that is push-pull controlled.

For generating a plurality of stable output DC voltages from a prescribed input DC voltage that, for example, is generated in a power pack that is isolated from electrical mains and is interruption-free, a plurality of individual step-down voltage regulators connected in parallel can be provided, each of which generates a respective output DC voltage. Since every step-down voltage regulator forms a separate unit and a corresponding plurality of such units are employed, the number of general components, as well as, magnetic components is extremely high. One possibility for reducing the general components outlay is the use of a two-transistor single-ended forward converter having a plurality of output windings to each of which is connected a respective storage inductor. However, this does not eliminate the significant outlay for magnetic components.

Furthermore, adverse influencing of the output DC voltages relative to one another occurs for fluctuations in loads connected to individual outputs. The prerequisites for preserving the relative voltage levels of the output DC voltages are established by using a current-fed push-pull forward converter having a plurality of output windings. The outlay for magnetic components, however, is still relatively great. Although the number of storage inductors used on the secondary side within the arrangement is reduced to a single storage inductor on the primary side, the outlay for magnetic components is still relatively high because a full transformer, that is a transformer having at least separate primary and secondary windings, continues to be employed as a transformer unit which implies relatively large dimensions particularly when high powers are to be supplied.

Step-down voltage regulators are well known in the prior art. In particular, specific designs of step-down voltage regulators are known, for example the designs of two-transistor single-ended forward converters or of current-fed push-pull converters. Corresponding basic circuits are disclosed, for example, in Elektronik 1978, No. 4, pages 102-107, particularly FIGS. 4, 9 and 13.

SUMMARY OF THE INVENTION

It is an object of the present invention to provide a plurality of stable output DC voltages from a prescribed input DC voltage with an optimally low outlay for component parts, particularly for magnetic component parts, so that the relationship of outlay to benefits is improved.

The current-fed push-pull converter of the present invention has a step-down regulating means and a transformer means that is push-pull controlled and that follows the step-down regulating means. The transformer means has push-pull switches, a transformer unit and a DC voltage tap circuit for providing a respective output DC voltage. The transformer unit is formed by an auto transformer that has a center tap connected to a ground reference point. The outlay for magnetic components becomes minimal because the transformer unit forgoes an independent primary winding. The dimensions of the transformer unit are reduced or the supplied power is increased. In any case, the relationship of outlay to benefit is improved. The center tap connected to the ground reference point also contributes to this improvement because the auto transformer can be used in both magnetization directions.

In a further development of the present invention at least one further DC voltage tap circuit is arranged preceding the push-pull switches. In another advantageous development of the present invention two DC voltage tap circuits are provided at least for one output DC voltage. The two DC voltage tap circuits are connected in parallel following the push-pull switches and fashioned such that one DC voltage tap circuit has an output DC voltage with a positive operational sign and the other DC voltage tap circuit has an output DC voltage with a negative operational sign. In accordance therewith, component parts when generating output DC voltages can be eliminated when at least one DC voltage tap circuit is arranged preceding the push-pull switches. The secondary windings for generating the individual output DC voltage are maximally exploited when respectively two DC voltage tap circuits are connected in parallel to the secondary windings, one DC voltage tap circuit thereof respectively generating a positive output DC voltage and the other generating a negative output DC voltage. When the DC voltage tap circuits are arranged following the push-pull switches, optimum tracking occurs for the individual output DC voltages.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
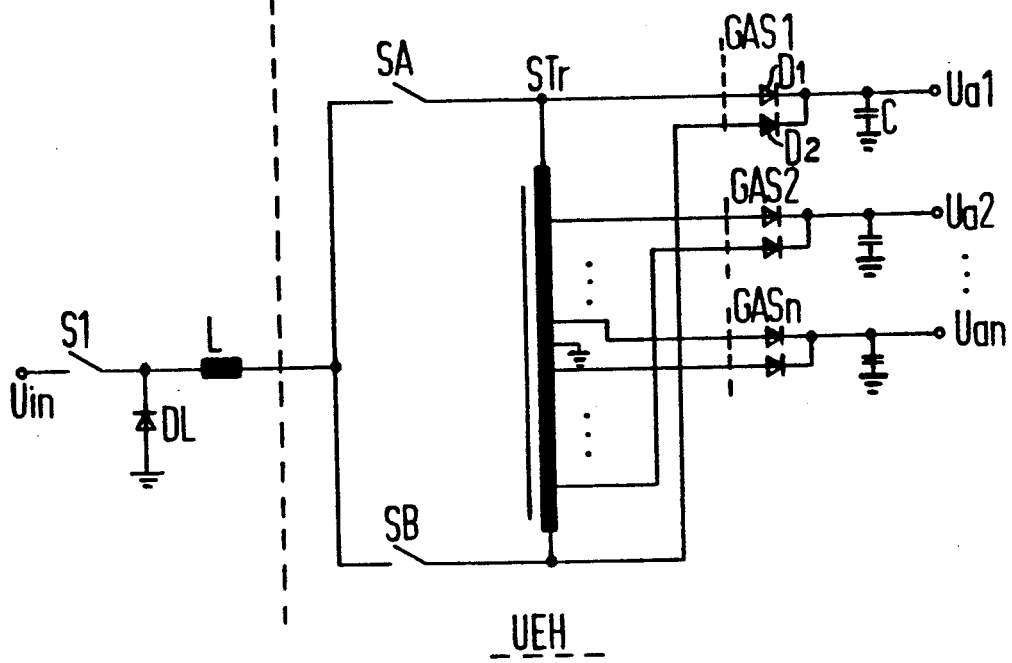
FIG. 1 is a circuit schematic of a current-fed push-pull converter according to the present invention.

The current-fed push-pull converter shown in FIG. 1 is composed of a step-down regulating means AE and of a transformer means UER that follows the step-down regulating means AE. The step-down regulating means AE is a storage inductor converter that has a regulating switch S1, an inductor demagnetization diode DL and a storage inductor L. The regulating switch S1 has its input side connected to an input DC voltage Uin that, for example, is a battery-buffered intermediate circuit voltage of a power pack means. The input DC voltage Uin in this case is separated from the electrical mains and protected against outage. As a result no additional measures for protection are required.

The regulating switch S1 is the single regulating component. By means of regulating switch S1, the storage inductor L and the inductor demagnetization diode DL, a regulated voltage that is referred to below as intermediate output voltage is generated from the input DC Voltage Uin. To this end, the regulating switch S1 has its output side connected both to a terminal of the storage inductor L as well as to the cathode of the inductor demagnetization diode DL. The anode of the inductor demagnetization diode DL is connected to ground potential that simultaneously forms the reference point for the overall circuit arrangement. The second connection of the storage inductor L forms the output of the step-down regulating means AE at which the intermediate output voltage is provided. Since the transformer means UER follows the step-down regulating means AE, the intermediate output voltage is also the input voltage of the transformer means UER.

The transformer means UER has two switches SA and SB operated in a push-pull manner and that are referred to below as push-pull switches, a transformer unit UEH and at least one DC voltage tap circuit GAS (shown as taps GAS1, GAS2 and GAS3 in FIG. 1, for example). The push-pull switches SA and SB have their respective input sides interconnected. The point of interconnection also forms the input of the transformer means UER. The intermediate output voltage of the step-down regulating means AE is applied at this point as an input voltage. The push-pull switches SA and SB of the transformer means UER are controlled such that they are respectively alternately opened and closed. The pulse-duty factor is permanently set and is respectively 50% of a clock period.

The push-pull switches SA and SB have their respective output sides connected to the transformer unit UEH. The transformer unit UEH is formed by an auto transformer STr that, by contrast to a full transformer, has only a single winding that is provided with taps for taking secondary voltages. The overall winding forms the primary winding, whereas secondary windings are realized by sub-windings between a tap and a reference point.

In the present invention, the reference point is formed by the center tap of the overall winding. With reference to the center tap, the overall winding is wound symmetrically toward both winding ends, so that every tap for an output DC voltage is doubly present. These taps are present in such fashion that they are respectively symmetrically arranged opposite one another with respect to the center tap. In this manner, the auto transformer STr can be utilized both in directions in the magnetization. The switches SA and SB are connected to the auto transformer STr as transformer unit UEH in such fashion, as mentioned above, that one switch is connected to one winding end and the other switch is connected to the other winding end of the overall winding.

The DC voltage tap circuits GAS are connected either to the two winding ends or to two winding taps of the overall winding of the one-coil transformer STr that lie symmetrically opposite one another with respect to the center tap. The output DC voltage Ua that is generated has greater magnitudes the farther the DC voltage tap circuits GAS are connected to the taps of the overall winding from the center tap.

In the embodiment of FIG. 1, n DC voltage tap circuits GAS1 through GASn are connected. These generate n output DC voltages Ua1 through Uan whose voltage magnitudes, in accordance with the previous statements, decrease from higher to lower values. The output DC voltages Ua1 through Uan are positive voltages in FIG. 1.

Each of the DC voltage tap circuits GAS are composed of two diodes D1 and D2 and of a capacitor C that are shown only at the first DC voltage tap circuit GAS1 for purposes of simplifying the drawing. The cathodes of the diodes of a DC voltage tap circuit GAS are interconnected, whereas the anodes are each respectively connected to one of the winding taps of the overall winding of the auto transformer STr. The interconnected cathodes of the diodes D1, D2 are connected to a terminal of the capacitor C on which the output DC voltage Ua occurs. If the diodes D1, D2 were arranged with opposite polarity, a negative output DC voltage −Ua would occur at the terminal of the capacitor C. The other terminal of the capacitor C is connected to the reference point.

Figure 2:
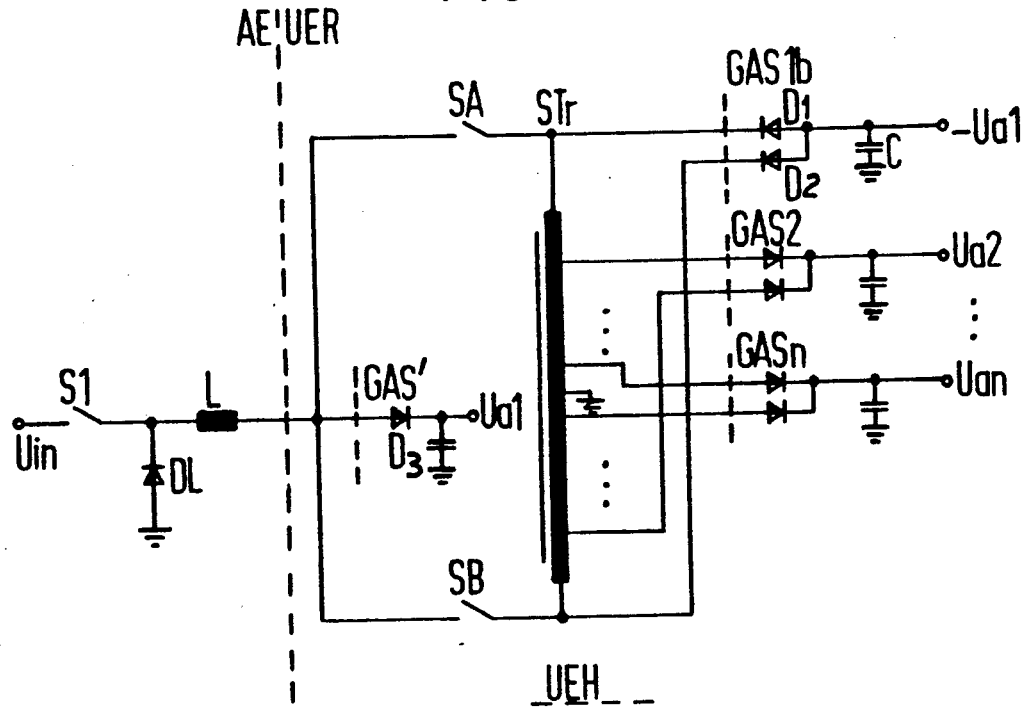
FIG. 2 is a circuit schematic of a first circuit alternative embodiment of the current-fed push-pull converter of FIG. 1.

The circuit arrangement shown in FIG. 2 essentially corresponds to the circuit arrangement of FIG. 1, with the difference that the diodes D1, D2 of the first DC voltage tap circuit GAS1b are connected oppositely to the diodes in DC voltage tap circuits GAS2, GASn and that a DC voltage tap circuit GAS' is arranged preceding the push-pull switches SA and SB. Due to the opposite polarization of the diodes D1, D2 of the first DC voltage tap circuit GAS1b, the first DC voltage tap circuit GAS1b generates a negative, first output DC voltage −Ua1. The DC voltage tap circuit GAS' arranged at the primary side of the one-coil transformer STr has only one diode D3 since no change occurs in operational sign with respect to the input voltage of the transformer means. A diode can be eliminated in this manner. According to FIG. 2, the diode D3 is connected in a direction such that the DC voltage tap circuit GAS' generates a positive, first output DC voltage Ua1.

Figure 3:
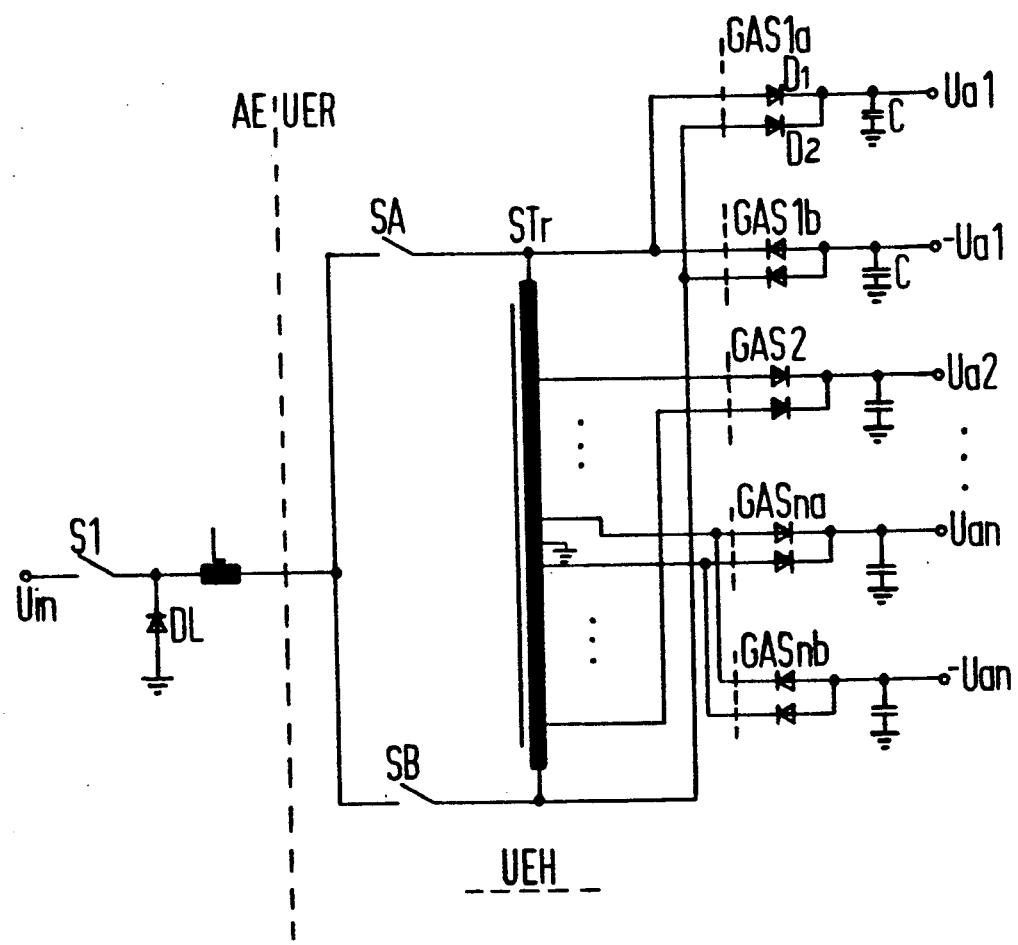
FIG. 3 is a circuit schematic of a second circuit alternative embodiment of the current-fed push-pull converter of FIG. 1.

The circuit arrangement according to FIG. 3 also essentially corresponds to the circuit arrangement of FIG. 1, with the difference that a respectively, second DC voltage tap circuit GAS1b or, respectively, GASnb is connected in parallel with the first and the nth DC voltage tap circuit GAS1a and GASnb, respectively. The first DC voltage tap circuits GAS1a and GASna thereby respectively generate the positive output DC voltages Ua1 and Uan, respectively, whereas the respective DC voltage tap circuits GAS1b or, respectively, GASnb that are respectively connected in parallel generate the negative output DC voltages −Ua1 and −Uan, respectively. The advantage of this circuit arrangement compared to the circuit arrangement of FIG. 2 is that the changes in voltage drop at the push-pull switches SA and SB have the same influence for all output DC voltages Ua. Changes in voltage drops at the push-pull switches SA and SB, for example, are produced by load fluctuations that occur at the outputs of the DC voltage tap circuits, these load fluctuations leading, for example, to an at least brief-duration decrease in isolated output DC voltages. By follow-up, the regulating switch S1 then attempts to prevent the drop of the appertaining output DC voltages, which leads to a general boost of all output DC voltages. Output DC voltages that are less loaded are thereby greatly elevated. Since, however, the above-recited load fluctuations cause changes in voltage drops at the push-pull switches SA and SB, as a result whereof the less loaded outputs are forced into the same reactions as the loaded outputs, namely to a lowering of the respective output DC voltages, the relationships of the individual output DC voltages relative to one another are always preserved. Expressed in other terms, this means that the relative voltage levels of the individual output DC voltage is preserved to the greatest degree.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A current-fed push-pull converter, comprising: a step-down regulating means connected to a transformer means that is push-pull controlled and that is connected following the step-down regulating means; the transformer means having push-pull switches connected to respective end terminals of a transformer unit and having at least one DC voltage tap circuit for providing a respective output DC voltage connected to respective first and second taps of the transformer unit; and the transformer unit being an auto transformer that has a center tap connected to a ground reference point, the first and second taps being equally spaced from the center tap.

2. The current-fed push-pull converter according to claim 1, wherein the transformer means has at least one further DC voltage tap circuit preceding the push-pull switches.

3. The current-fed push-pull converter according to claim 1, wherein the transformer means has two DC voltage tap circuits, said two DC voltage tap circuits connected in parallel following the push-pull switches such that one DC voltage tap circuit of said two DC voltage tap circuits has an output DC voltage with a positive operational sign and the other DC voltage tap circuit of said two voltage tap circuits has an output DC voltage with a negative operational sign.

4. A current-fed push-pull converter for converting an input DC voltage to at least one output DC voltage comprising:
   means for step-down regulating having an input for the input DC voltage and an output for providing an intermediate output voltage, said means for step-down regulating having a regulating switch means in series with a storage inductor connected between said input and said output and an inductor demagnetization diode connected from the juncture of said regulating switch means and said storage inductor to ground;
   transformer means having an input connected to said output of said means for step-down regulating, said transformer means having first and second push-pull switches and having a transformer unit having first and second end terminals, a center reference point and at least one set of first and second taps, said first and second taps equally spaced from said center reference point and said first and second push-pull switches connected between said input of said transformer means and said first and second end terminals of said transformer unit, said transformer means further having at least one DC voltage tap circuit having first and second inputs connected to one of said first and second taps, respectively, and said first and second push-pull switches, respectively, said at least one DC voltage tap circuit having a first diode connected between said first input and an output of said DC voltage tap circuit, a second diode connected between said second input and said output of said DC voltage tap circuit and a capacitor connected from the output of said DC voltage tap circuit to ground, said transformer unit being an auto one-coil transformer.

5. A current-fed push-pull converter according to claim 4, wherein said transformer means has one further DC voltage tap circuit having an input connected to said input of said transformer means and having an output for providing a further output DC voltage.

6. The current-fed push-pull converter according to claim 4, wherein said transformer means has two DC voltage tap circuits, said two DC voltage tap circuits connected in parallel and having their first and second inputs connected respectively to one of said first and second push-pull switches, respectively, and said first and second taps, respectively, such that one DC voltage tap circuit of said first and second DC voltage tap circuits has an output DC voltage with a positive operational sign and the other DC voltage tap circuit of said first and second DC voltage tap circuits has an output DC voltage with a negative operational sign 7. A current-fed push-pull converter according to claim 4, wherein said current-fed push-pull converter comprises a plurality of DC voltage tap circuits connected respectively to a plurality of sets of taps of said transformer unit.

8. A current-fed push-pull converter for converting an input DC voltage to at least one output DC voltage, comprising:
   means for step-down regulating having an input for the input DC voltage and an output for providing an intermediate output voltage;
   transformer means having an input connected to said output of said means for step-down regulating, said transformer means having first and second push-pull switches and having a transformer unit having first and second end terminals, a center reference point and at least one set of first and second taps, said first and second taps equally spaced from said center reference point and said first and second push-pull switches connected between said input of said transformer means and said first and second end terminals of said transformer unit, said transformer means further having at least two DC voltage tap circuits each having first and second inputs connected to one of said first and second taps, respectively, and said first and second push-pull switches, respectively, said transformer unit being an auto transformer;
   said two DC voltage tap circuits connected in parallel having their first and second inputs connected respectively to one of said first and second push-pull switches, respectively, and said first and second taps, respectively, such that one DC voltage tap circuit of said two DC voltage tap circuits has an output DC voltage with a positive operational sign and the other DC voltage tap circuit of said two tap circuits has an output DC voltage with a negative operational sign.

9. A current-fed push-pull converter according to claim 8, wherein said transformer means has one further DC voltage tap circuit having an input connected to said input of said transformer means and having an output for providing a further output DC voltage.

10. A current-fed push-pull converter according to claim 8, wherein said current-fed push-pull converter comprises a plurality of DC voltage tap circuits connected respectively to a plurality of sets of taps of said transformer unit.

* * * * *